United States Patent
Mann et al.

(10) Patent No.: US 9,967,133 B2
(45) Date of Patent: May 8, 2018

(54) USING GLOBAL VARIABLES TO DATA-DRIVE RULE ENGINE EVALUATION

(71) Applicant: Provenance Asset Group LLC, Essex, CT (US)

(72) Inventors: Robert A. Mann, Carp (CA); Peter K. Jorgensen, Nepean (CA)

(73) Assignee: Provenance Asset Group LLC, Essex, CT (US)

( * ) Notice: Subject to any disclaimer, the term of this patent is extended or adjusted under 35 U.S.C. 154(b) by 451 days.

(21) Appl. No.: 14/573,861

(22) Filed: Dec. 17, 2014

(65) Prior Publication Data
US 2016/0182283 A1 Jun. 23, 2016

(51) Int. Cl.
G06F 15/177 (2006.01)
H04L 12/24 (2006.01)

(52) U.S. Cl.
CPC ...... *H04L 41/0233* (2013.01); *H04L 41/0813* (2013.01)

(58) Field of Classification Search
CPC ............... H04L 12/1407; H04L 45/304; H04L 67/1036; H04L 43/50; H04M 15/66
See application file for complete search history.

(56) References Cited

U.S. PATENT DOCUMENTS

| | | | | |
|---|---|---|---|---|
| 8,948,750 B1* | 2/2015 | Carames | .......... | H04W 8/12 455/418 |
| 2012/0177028 A1* | 7/2012 | Mo | .......... | H04L 12/1407 370/351 |
| 2012/0221693 A1* | 8/2012 | Cutler | .......... | H04M 15/66 709/223 |
| 2013/0094436 A1* | 4/2013 | Kwan | .......... | H04W 8/18 370/328 |
| 2013/0322327 A1* | 12/2013 | Jorgensen | .......... | H04W 40/00 370/328 |
| 2015/0149656 A1* | 5/2015 | McMurry | .......... | H04L 45/00 709/238 |
| 2016/0073290 A1* | 3/2016 | Kakadia | .......... | H04W 24/08 370/216 |

\* cited by examiner

*Primary Examiner* — Shean S Tokuta
(74) *Attorney, Agent, or Firm* — Dinsmore & Shohl LLP

(57) ABSTRACT

Various exemplary embodiments relate to a Diameter network device which may include a storage configured to store one or more global variables, a memory; and a processor. The processor may be configured to: establish an object within the memory representative of a global variable; configure the object to access fields of the global variable including a property of the network device which was modified; and access via the object an attribute for the global variable.

21 Claims, 6 Drawing Sheets

RULE TABLE: Initialize Global Vars

RULE SYSTEM VERSION: demo (Draft)

RULE SETS:
  Initialization

EXECUTE [RULE Init Diameter Identities]

405 — (Global Variables.Local-Identity.Set = Properties.Get-System-Property (Property Name = Local-Identity))) AND
410 — (Global Variables.Next-DCP-FQDN.Set = Properties.Get-Java-Property (Property Name = next.dcp.fqdn)) AND
415 — (Global Variables.Next-DCP-Realm.Set = Properties.Get-Java-Property (Property Name = next.dcp.realm))

RULE TABLE: Route Message

RULE SYSTEM VERSION: demo (Draft)

RULE SETS:
Diameter Request

IF [RULE Forward In Ring] ⎯ 505
// If the message isn't for the local system, forward it to the next
// routing agent in the ring.
(Diameter Request.Destination-Host != Global Variables. Local-Indentity)
THEN ⎯ 510
(Diameter Request.Destination-Host.Set = Global Variables.Next-DCP-FQDN) AND
(Diameter Request.Destination-Realm.Set = Global Variables.Next-DCP-Realm) AND
(System.Stop-Rule-Evaluation)

USING GLOBAL VARIABLES TO DATA-DRIVE RULE ENGINE EVALUATION

CROSS-REFERENCE TO RELATED APPLICATIONS

This application is a continuation-in-part of the following co-pending applications, application Ser. No. 13/482,690 "ROUTING DECISION CONTEXT OBJECTS", and application Ser. No. 13/482,597 "ROUTING DECISION CONTEXT OBJECTS", and patent, U.S. Pat. No. 8,850,064, "RULE ENGINE EVALUATION OF CONTEXT OBJECTS" which are incorporated by reference.

TECHNICAL FIELD

Various exemplary embodiments disclosed herein relate generally to computer networking, and more particularly, but not exclusively, to Diameter routing agents.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to Diameter network device comprising: a storage configured to store one or more global variables; a memory; and a processor configured to: establish an object within the memory representative of a global variable; configure the object to access fields of the global variable including a property of the network device which was modified; and access via the object an attribute for the global variable.

Various exemplary embodiments are described wherein the processor is further configured to access via the object an action for the global variable.

Various exemplary embodiments are described wherein the action is such that it allows the global variable to be set by with name with a correct type.

Various exemplary embodiments are described wherein the processor is further configured to: access an attribute which allows the value of the global variable to be retrieved by name as a type specified for the global variable.

Various exemplary embodiments are described wherein the processor is further configured to execute an initialization rule set to update the global variable.

Various exemplary embodiments are described wherein, the processor is further configured to: modify via the object, a first system property which indicates the identity of the device and a second system property which indicates the identity of the destination host.

Various exemplary embodiments are described wherein the processor is further configured to access via the object, instructions to execute an initialization rule set to create the global variable on a different network device, such that the same rule can be used on the different network device.

Various exemplary embodiments relate to a non-transitory machine-readable medium encoded with instructions for execution by a Diameter network device, the medium comprising: instructions for establishing within a memory, an object representative of a global variable; instructions for configuring the object to access fields of the global variable including a property of the network device which was modified; and instructions for accessing via the object an attribute for the global variable.

Various exemplary embodiments are described wherein accessing further comprises accessing via the object an action for the global variable.

Various exemplary embodiments are described wherein the instructions further comprises: accessing an attribute which allows the value of the global variable to be retrieved by name as a type specified for the global variable.

Various exemplary embodiments are described wherein the instructions further comprises: modifying via the object, a first system property which indicates the identity of the device and a second system property which indicates the identity of the destination host.

Various exemplary embodiments are described wherein the instructions further comprises: executing an initialization rule set to update the global variable.

Various exemplary embodiments are described wherein the action is such that it allows the global variable to be set by with name with a correct type.

Various exemplary embodiments are described wherein the instructions further comprises: accessing via the object, instructions to execute an initialization rule set to create the global variable on a different network device, such that the same rule can be used on the different network device.

Various exemplary embodiments relate to a method performed by a Diameter network device, the method comprising: establishing within a memory, an object representative of a global variable; configuring the object to access fields of the global variable including a property of the network device which was modified; and accessing via the object an attribute for the global variable.

Various exemplary embodiments are described wherein accessing further comprises: accessing via the object an action for the global variable.

Various exemplary embodiments are described wherein the method further comprises: accessing an attribute which allows the value of the global variable to be retrieved by name as a type specified for the global variable.

Various exemplary embodiments are described wherein the method further comprises: modifying via the object, a first system property which indicates the identity of the device and a second system property which indicates the identity of the destination host.

Various exemplary embodiments are described wherein the method further comprises: executing an initialization rule set to update the global variable.

Various exemplary embodiments are described wherein the action is such that it allows the global variable to be set by with name with a correct type.

Various exemplary embodiments are described wherein the method further comprises: accessing via the object, instructions to execute an initialization rule set to create the global variable on a different network device, such that the same rule can be used on the different network device.

BRIEF DESCRIPTION OF THE DRAWINGS

In order to better understand various exemplary embodiments, reference is made to the accompanying drawings, wherein:

FIG. 4 illustrates an exemplary initialization rule set;

FIG. 5 illustrates an exemplary Diameter global variable rule set; and

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAs) available today utilize nearly identical sets of rules for each DRA. Hard coded values which are set up on individual components may be time consuming and very prone to user or maintenance error. Similarly, variables which are coded as literals on each DRA may be confusing to understand, such as an individual number like "20" indicating a user's setting. Thus, it would be beneficial if a plurality of DRAs could access the same or similar literals as global variables to avoid redundant coding.

Figure 1:
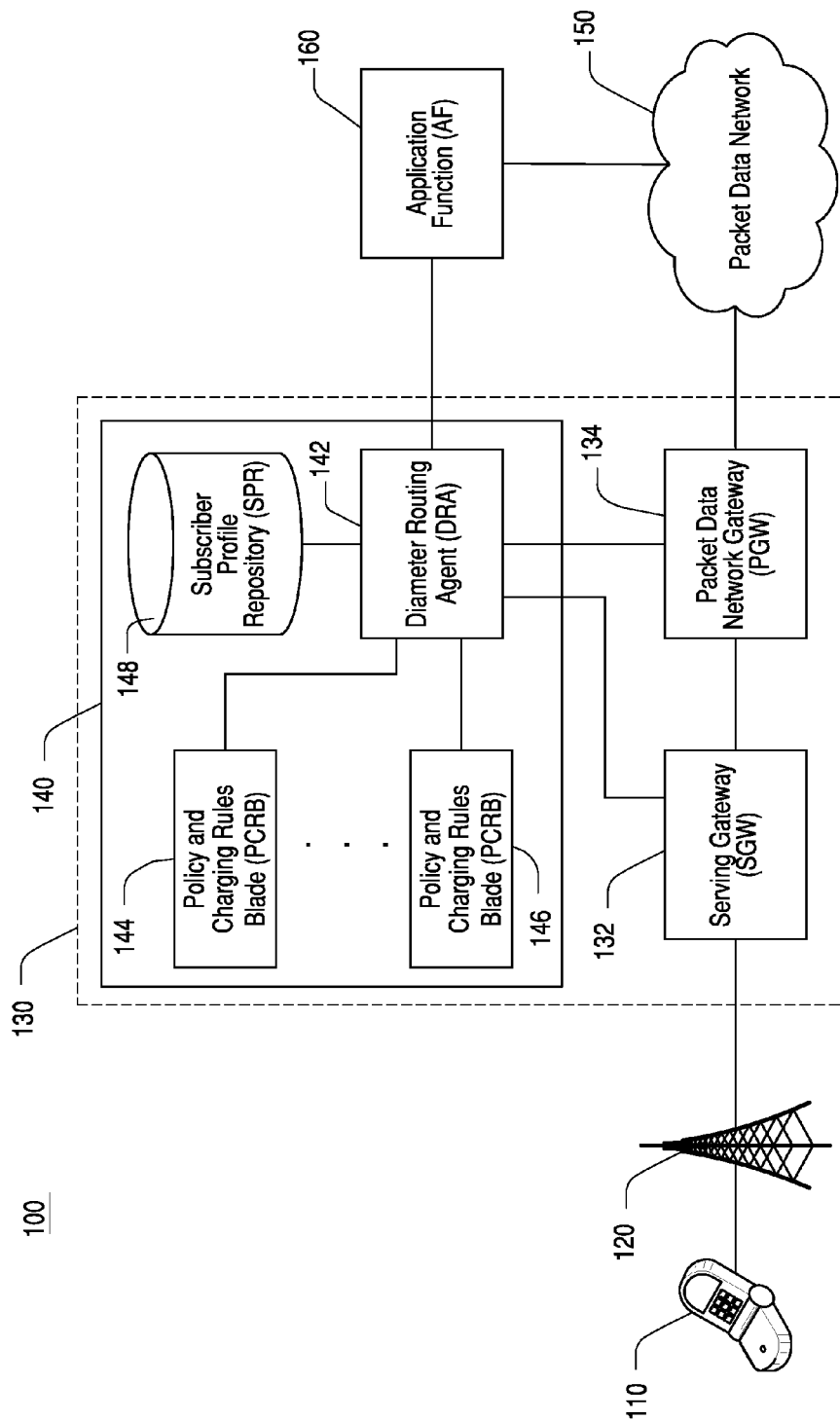
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 148 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
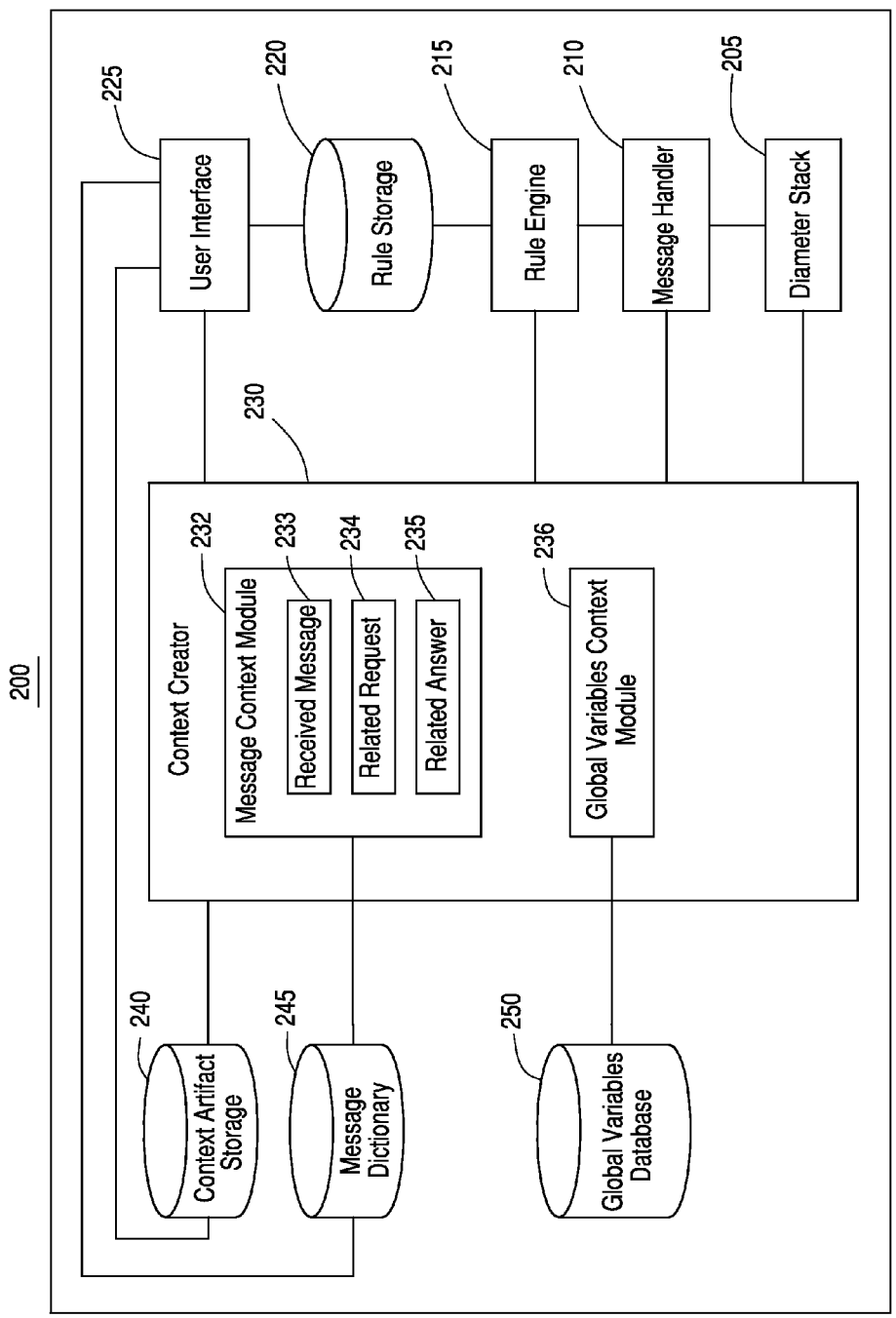
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, global variables database 250.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from on the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack based upon one or more context object actions invoked by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structure for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, or global variables.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, or a global variable context. These context artifacts may be used by context creator 230 at run-time to instantiate different types of context objects. As such, context creator 230 may be viewed as including a global variables context module 236. In various embodiments, a user may be able to define new context artifacts via user interface 225 for storage in context artifact storage, such as by specifying an existing file (e.g. a .jar file) or by defining a new context artifact using a text editor of the user interface 225.

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an RX RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary 245, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting, via the API, that Diameter stack 205 construct the answer message. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As an example, global variables context module 236 may be configured to instantiate a global variables context object. Such global variables context object may include a name, and a type. For example, the type may be an integer, floating point, variable, etc. Global variables context module may store global variables in global variables database 250. Global variables database 250 may be any machine-readable medium capable of storing such as read-only memory (ROM), random-access memory (RAM), magnetic disk storage media, optical storage media, flash-memory devices and/or similar storage media.

It should be noted that while rule storage 220, context artifact storage 240, message dictionary 245, and global variables database 250 are illustrated as separate devices, one or more of these components may be resident on multiple storage devices. Further, one or more of these components may share a storage device. For example, rule storage, context artifact storage 240, message dictionary 245, and global variables database 250 may all refer to portions of the same hard disk or flash memory device.

Figure 3:
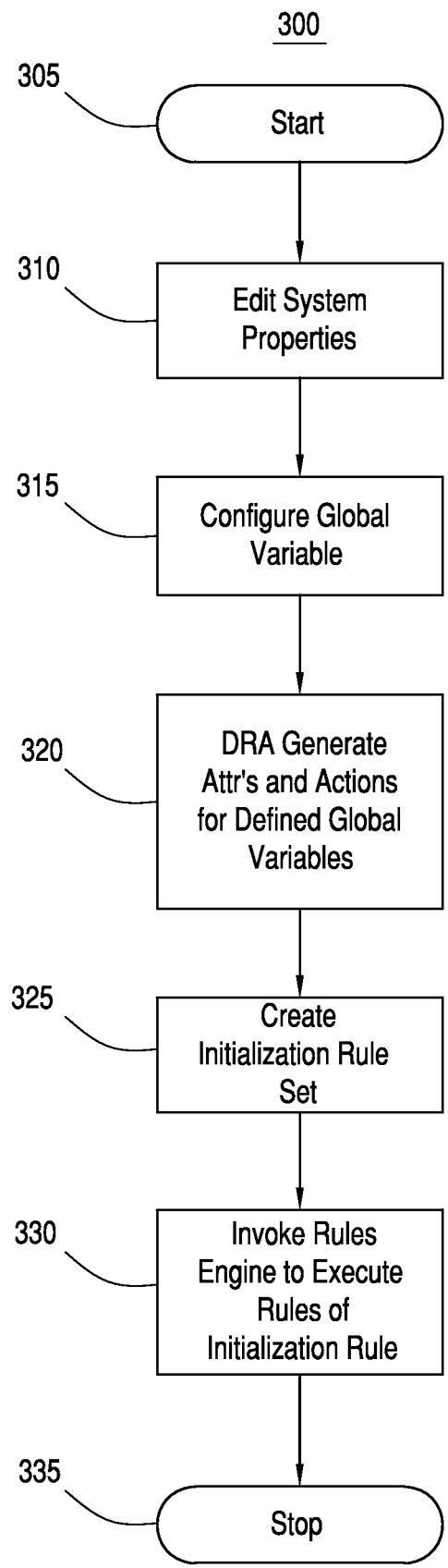
FIG. 3 illustrates an exemplary method for initializing Diameter message global variables.

FIG. 3 illustrates an exemplary method for generating Diameter message global variables 300. DRA 200, for example, may implement the method 300. DRA 200 may begin in step 305 and proceed to step 310 where a user may edit DRA system properties. DRA system properties may be any kind of properties including Java, C, or general configuration information. A user may edit system properties, while the properties may similarly be automatically extracted. System properties may be extracted from a text file, Java properties, JSon or Application System Configuration (ASC) properties files, for example. The system properties may be provisioned, for example, into the DRA's storage or a relevant database.

In one embodiment, Java as well as ASC system properties may be specified for local identity or next DRA identification. For example, a local Diameter identity may be stored as a ASC system property and next DRA identity as a Java property. For example, a tpa.properties file may be modified by adding: "next.dcp.fqdn=dcp.ottawaRealm" and "next.dcp.realm=ottawaRealm." Every DRA may have a unique value for these properties.

DRA 200 may proceed to step 315 where DRA 200 may configure Diameter message global variables. To configure Diameter message global variables, a user may specify Diameter message global variables by entering them in a user interface such as user interface 225. Diameter message global variables may similarly be extracted automatically. Diameter message global variables may be extracted, for example, from a text file, Java properties file, JSon, ASC properties file, or DRA storage/database.

The Diameter message global variables may be specified as any kind of data type. For example, the variables may be an integer, a string, a floating point, or any other kind of data type. The Diameter message global variables may similarly be identified by a name or identifying mark. Further, the Diameter message global variables may be specified as a constant or a variable.

DRA 200 may proceed to step 320 where DRA 200 may generate attributes and actions for defined Diameter message global variables. The DRA may utilize data or criteria specified in step 315, for example, to generate attributes and actions which the DRA can use later to write Diameter rules utilizing rule engine 215. In some embodiments, a global variable context is created using context creator 230.

For each defined global variable, a rule engine attribute may be created in a Global Variables context. Similarly, global variables could be part of another context, not necessarily their own context. The rule engine attribute, for example, may allow a value of the Diameter message global variable to be accessed or retrieved by using its variable type as a name. For example, "local-identity" may be used as a string value and accessed using attribute "global variables.local-identity".

Similarly, a rule engine action may be created in a Global Variables context. The rule engine action may also allow the value of the Diameter message global variable to be set by name using a correct type. For example, when a Diameter message global variable is declared as a constant, then the action to set the Diameter message global variable is only available in the "initialization" rule set. In a specific example, the "next-dcp-realm" Diameter message global variable may be set to a string value using the action "global variables.next-dcp-realm.set", but only in an initialization rule set since "next-dcp-realm" was declared as a constant.

In step 325 an initialization rule set may be created such as exemplary initialization rule set 400. The initialization rule set may be created by a user according to the requirements of DRA 200. Similarly, the rule set may be created automatically or transmitted remotely via a file. DRA 200 may then proceed to step 330 where DRA 200 may invoke the initialization rule set created in step 325.

In step 330, an initialization rule set may be invoked. The initialization rule set may be invoked in a number of ways and under different conditions. For example, initialization rule set may be invoked automatically when changes are detected in DRA 200. For example, DRA 200 may detect system properties changed such as when a host or realm has changed, or network topology has been modified. Similarly a user may invoke the initialization rule set either locally or by remote access. Installation or execution of a new rule system version on DRA 200 may also invoke initialization rule set. An invocation of initialization rule set may, for example, occur when there has been a change to Java or ASC system properties and global variables need to be updated or modified. DRA 200 may then proceed to step 335 where DRA 200 may cease operation for that rule or rule set.

FIG. 4 illustrates an exemplary initialization rule set 400. Exemplary initialization rule set 400 may be used to initialize Diameter message global variables on DRA 200. For example, when a new DRA is added to a network, such as a ring topology network, all steps of method 300 are performed on the new DRA. Steps, 310 and 330 may also be performed on an existing DRA which is upstream of the new DRA being added to the network. In exemplary initialization rule set 400 rule execution line 405 assigns system property "local-identity" to global variable "local-identity." In exemplary initialization rule set 400 rule execution line 410 assigns system property "next-dcp-fqdn" to global variable "next-dcp-fqdn." Similarly, in exemplary initialization rule set 400 rule execution line 415 assigns system property "next-dcp-realm" to global variable "next-dcp-realm." A user may initiate an invocation of the initialization rule set when the new DRA has been added. This initialization may enable the routing of messages to newly added DRA.

FIG. 5 illustrates an exemplary Diameter global variable rule set 500. A user may write rules using the Diameter message global variables. The user may accomplish this via rule engine 215, and context creator 230 for accessing the Diameter message global variables, for example. In exemplary Diameter global variable rule set 500, rule condition 505 determines if a message should be forwarded by determining if it is the correct host. Rule execution 510 then forwards the message to the next router when it is not the destination. Diameter message global variables 515, 520, and 525 are used in analysis in determining the next host, as well as the current host's identification.

Diameter messages which are processed by DRA 200, may use rules engine 215 to evaluate rules. When rules which have Diameter message global variables, assigned values of those variables are used in processing rules, at each DRA. One context may be used for Java along with ASC properties. Similarly, a separate global variable context may be used for each property configuration.

Figure 6:
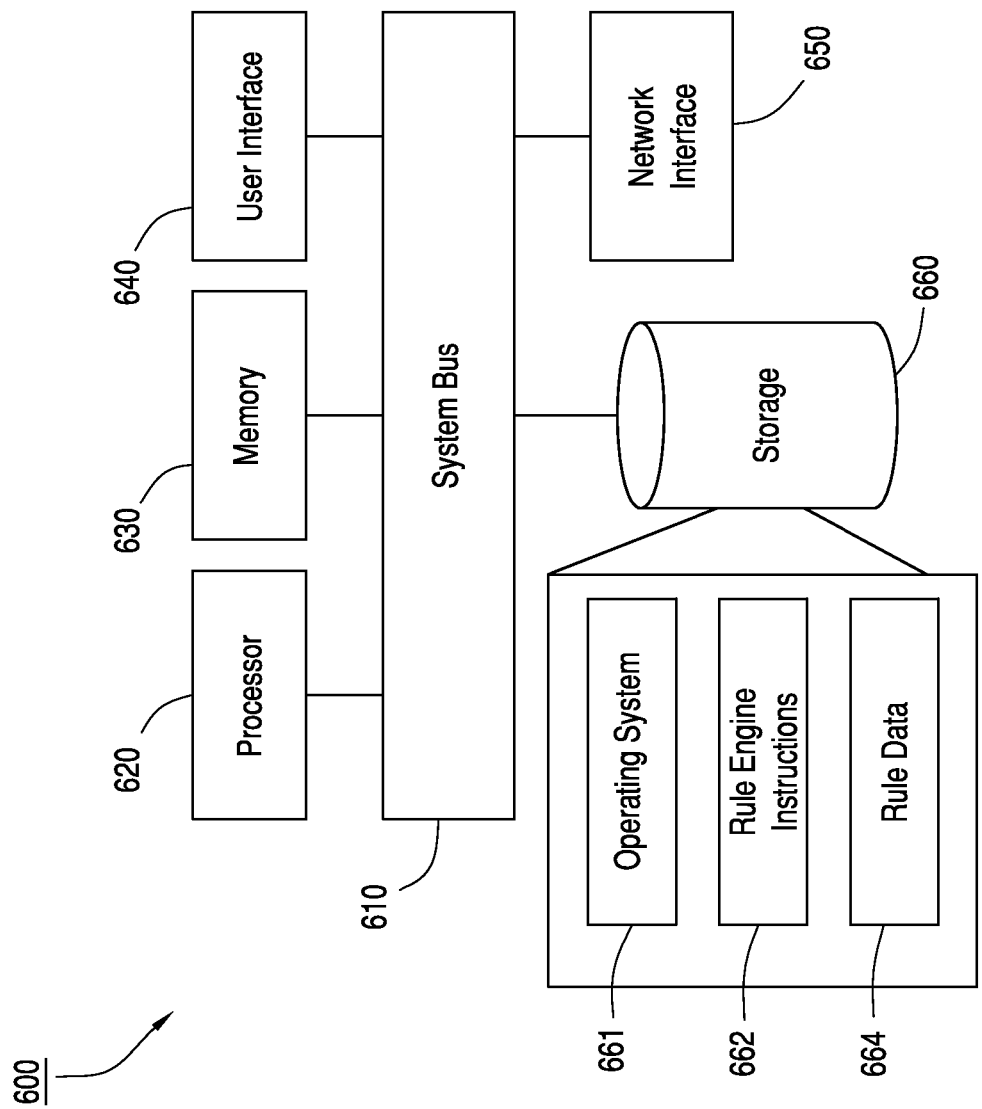
FIG. 6 illustrates an exemplary hardware diagram.

FIG. 6 illustrates an exemplary hardware diagram for a device 600 such as device including a manager in a system. The exemplary device 600 may correspond to DRA of FIG. 3. As shown, the device 600 includes a processor 620, memory 630, user interface 640, network interface 650, and storage 660 interconnected via one or more system buses 610. It will be understood that FIG. 6 constitutes, in some respects, an abstraction and that the actual organization of the components of the device 600 may be more complex than illustrated.

The processor 620 may be any hardware device capable of executing instructions stored in memory 630 or storage 660. As such, the processor may include a microprocessor, field programmable gate array (FPGA), application-specific integrated circuit (ASIC), or other similar devices.

The memory 630 may include various memories such as, for example L1, L2, or L3 cache or system memory. As such, the memory 630 may include static random access memory (SRAM), dynamic RAM (DRAM), flash memory, read only memory (ROM), or other similar memory devices.

The user interface 640 may include one or more devices for enabling communication with a user such as an administrator. For example, the user interface 640 may include a display, a mouse, and a keyboard for receiving user commands.

The network interface 650 may include one or more devices for enabling communication with other hardware devices. For example, the network interface 650 may include a network interface card (NIC) configured to communicate according to the Ethernet protocol. Additionally, the network interface 650 may implement a TCP/IP stack for communication according to the TCP/IP protocols. Various alternative or additional hardware or configurations for the network interface 650 will be apparent.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon with the processor 620 may operate. For example, the storage 660 may store operating system 661 for executing rule engine instructions. The storage 660 may also store rule engine instructions 662 for performing Diameter message management according to the concepts described herein. The storage may also store rule data 664, for use by the processor executing the rule engine instructions 662.

While the host device 600 is shown as including one of each described component, the various components may be duplicated in various embodiments. For example, the processor 620 may include multiple microprocessors that are configured to independently execute the methods described herein or are configured to perform steps or subroutines of the methods described herein such that the multiple processors cooperate to achieve the functionality described herein. Further, where the device 600 is implemented in a cloud computing system, the various hardware components may belong to separate physical systems. For example, the processor 620 may include a first processor in a first server and a second processor in a second server.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A Diameter network device comprising:
a storage configured to store a plurality of global variables corresponding to the Diameter network device's system properties and configuration, wherein each global variable respectively replaces a literal for a Diameter Routing Agent and an action to set each global variable value is only available in an initialization rule set, wherein the initialization rule set is invoked when at least one of: changes are detected in the Diameter network device, installation of a new rule system version on the Diameter network device is detected, a change to the Diameter network device's system properties has been detected, or the Diameter network device is newly added to a network;
a memory; and
a processor configured to establish an object within the memory representative of a respective global variable, access fields of the global variable including a property of the network device which was modified via utilizing information in the object, and access, via utilizing information in the object, an attribute for the global variable.

2. The Diameter network device of claim 1, wherein the processor is further configured to access, via utilizing information in the object, an action for the global variable.

3. The Diameter network device of claim 2, wherein the action is such that it allows the global variable to be set by with name with a correct type.

4. The Diameter network device of claim 1, wherein the processor is further configured to access the attribute to allow a value of the global variable to be retrieved by name as a type specified for the global variable.

5. The Diameter network device of claim 1, wherein the processor is further configured to execute the initialization rule set to update the global variable.

6. The Diameter network device of claim 1, wherein the processor is further configured to modify via utilizing information in the object, a first system property which indicates an identity of the Diameter network device and a second system property which indicates an identity of a destination host.

7. The Diameter network device of claim 1, wherein the processor is further configured to access via utilizing information in the object, instructions to execute the initialization rule set to create the global variable on a different Diameter network device, wherein an identical rule is used on the different Diameter network device.

8. A non-transitory machine-readable medium encoded with instructions for execution by a Diameter network device, the medium comprising:
instructions for establishing within a memory, an object representative of a respective global variable of a plurality of global variables corresponding to the Diameter network device's system properties and configuration, wherein each global variable respectively replaces a literal for a Diameter Routing Agent and an action to set each global variable value is only available in an initialization rule set, wherein the initialization rule set is invoked when at least one of: changes are detected in the Diameter network device, installation of a new rule system version on the Diameter network device is detected, a change to the Diameter network device's system properties has been detected, or the Diameter network device is newly added to a network;
instructions for accessing fields of the global variable including a property of the Diameter network device which was modified via utilizing information in the object; and
instructions for accessing, via utilizing information in the object, an attribute for the global variable.

9. The non-transitory machine-readable storage medium of claim 8, further comprising:
accessing, via utilizing information in the object, an action for the global variable.

10. The non-transitory machine-readable storage medium of claim 8, further comprising:
instructions for accessing the attribute to allow a value of the global variable to be retrieved by name as a type specified for the global variable.

11. The non-transitory machine-readable storage medium of claim 8, further comprising:
instructions for modifying via utilizing information in the object, a first system property which indicates an identity of the Diameter network device and a second system property which indicates an identity of a destination host.

12. The non-transitory machine-readable storage medium of claim 8, further comprising:
instructions for executing the initialization rule set to update the global variable.

13. The non-transitory machine-readable storage medium of claim 9, further comprising:
instructions for setting, with the action for the global variable, a name with a correct type.

14. The non-transitory machine-readable storage medium of claim 8, further comprising:
instructions for accessing via utilizing information in the object; and
instructions for executing the initialization rule set to create the global variable on a different Diameter network device, wherein an identical rule can be used on the different Diameter network device.

15. A method performed by a Diameter network device, the method comprising:
establishing, within a memory, an object representative of a respective global variable of a plurality of global variables corresponding to the Diameter network device's system properties and configuration, wherein each global variable respectively replaces a literal for a Diameter Routing Agent and an action to set each global variable value is only available in an initialization rule set, wherein the initialization rule set is invoked when at least one of: changes are detected in the Diameter network device, installation of a new rule system version on the Diameter network device is detected, a change to the Diameter network device's system properties has been detected, or the Diameter network device is newly added to a network;
accessing fields of the global variable including a property of the Diameter network device which was modified via utilizing information in the object; and
accessing, via utilizing information in the object, an attribute for the global variable.

16. The method of claim 15, further comprising:
accessing, via utilizing information in the object, an action for the global variable.

17. The method of claim 15, further comprising:
accessing the attribute to allow a value of the global variable to be retrieved by name as a type specified for the global variable.

18. The method of claim 15, further comprising:
modifying, via utilizing information in the object, a first system property which indicates an identity of the Diameter network device and a second system property which indicates an identity of a destination host.

19. The method of claim 15, further comprising:
executing the initialization rule set to update the global variable.

20. The method of claim 16, further comprising:
setting, with the action for the global variable, a name with a correct type.

21. The method of claim 15, further comprising:
accessing, with a processor via utilizing information in the object, instructions to execute the initialization rule set to create the global variable on a different Diameter network device, wherein an identical rule can be used on the different Diameter network device.

* * * * *